US008406599B1

(12) United States Patent
Dragic

(10) Patent No.: US 8,406,599 B1
(45) Date of Patent: Mar. 26, 2013

(54) REDUCED BRILLOUIN GAIN COEFFICIENT OPTICAL FIBERS AND MATERIAL SELECTION FOR SAME

(76) Inventor: Peter Dragic, Chicago, IL (US)

( * ) Notice: Subject to any disclaimer, the term of this patent is extended or adjusted under 35 U.S.C. 154(b) by 589 days.

(21) Appl. No.: 12/661,456

(22) Filed: Mar. 17, 2010

Related U.S. Application Data

(60) Provisional application No. 61/210,314, filed on Mar. 17, 2009.

(51) Int. Cl.
*G02B 6/00* (2006.01)

(52) U.S. Cl. ........................................ 385/141
(58) Field of Classification Search .............. 385/141
See application file for complete search history.

(56) References Cited

U.S. PATENT DOCUMENTS

2008/0013906 A1* 1/2008 Matsuo et al. .............. 385/127

OTHER PUBLICATIONS

G.O. Karapetyan et al., "Physical consequences of inhomogeneous glass structure from scattered light spectroscopy data," J. Non-Cryst. Solids 126, 93-102 (1990).
P.D. Dragic, "Brillouin Spectroscopy of Nd—Ge co-doped Silica Fibers," Journal of Non-Crystalline Solids 355, 403-413 (2009).
P. D. Dragic, "Simplified model for effect of Ge doping on silica fibre acoustic properties", Electronics Letters, v 45, n. 5, p. 256-7, Feb. 26, 2009.
R.E. Youngman, J. Kieffer, J.D. Bass, and L. Duffrène, "Extended structural integrity in network glasses and liquids," J. Non-Cryst. Solids 222, 190-198 (1997).
C. Krischer, "Optical Measurements of Ultrasonic Attenuation and Reflection Losses in Fused Silica," J. Acoust. Soc. Am. 48, 1086-1092 (1970).
C.R. Hammond and S.R. Norman, "Silica based binary glass systems—refractive index behaviour and composition in optical fibres," Opt. Quantum Electron. 5, 399-409 (1977).
J.E. Masnik et al., "The complex mechanical modulus as a structural probe: The case of alkali borate liquids and glasses," J. Chem. Phys. 103, 9907-9917 (1995).
A.V. Anan'ev et al., "Origin of Rayleigh scattering and anomaly of elastic properties in vitreous and molten GeO2," Jour.of Non-Crystalline Solids, vol. 354,p. 3049-3058,(2008).
P.J. Thomas et al., "Normal acoustic modes and Brillouin scattering in single-mode optical fibers," Phys. Rev. B 19, 4986-4998 (1979).

* cited by examiner

*Primary Examiner* — Ryan Lepisto
*Assistant Examiner* — Jerry Blevins
(74) *Attorney, Agent, or Firm* — Carmen Patti Law Group, LLC

(57) ABSTRACT

A method for creating a composite material for fabricating an optical fiber. The method includes selecting multiple constituents and a concentration for each constituent, conceptually dividing a unit length model rod into a number of segments, computing origin locations for the segments, computing a longitudinal acoustic velocity for an assumed composite material, computing a photoelastic constant for the assumed composite material, computing an acoustic frequency for the assumed composite material, computing an acoustic attenuation coefficient for the assumed composite material, computing a Brillouin Spectral Width for the assumed composite material, and computing a Brillouin Gain Coefficient for the assumed composite material. if the computed Brillouin Gain Coefficient is greater than a preselected value, repeating the above, otherwise, mixing the constituents at an appropriate temperature. The number equals the number of constituents, and each segment is associated with a separate one of the constituents.

24 Claims, 11 Drawing Sheets

REDUCED BRILLOUIN GAIN COEFFICIENT OPTICAL FIBERS AND MATERIAL SELECTION FOR SAME

CROSS-REFERENCE TO RELATED APPLICATIONS

This application claims priority under 35 U.S.C §119 to U.S. Provisional Application No. 61/210,314, titled "CALCULATION OF THE BRILLOUIN GAIN COEFFICIENT FOR SILICA GLASS CONTAINING MULTIPLE INDEPENDENT CO-DOPANTS", filed Mar. 17, 2009 which is herein incorporated by reference in its entirety.

BACKGROUND

An optical fiber is a glass or plastic fiber designed to transport a light signal along its length. The use of optical fibers in communication systems permits transmission over longer distances and at higher bandwidths (data rates) than other forms of communications. Signals in optical fibers generally are undisturbed by electromagnetic interference and can be transported with less loss than signals transported via metallic conductors. Light signals are maintained in the core of the optical fiber by total internal reflection which results in the fiber acting as a waveguide. In general, an optical fiber has a core and a cladding typically with the majority of the light in the fiber being confined to the optical core, i.e., the waveguide.

Under certain conditions of power and sufficiently narrow signal spectrum, acoustic waves can be generated in the fiber which interfere with transmission of the optical signal by scattering it. This scattering is known as Stimulated Brillouin Scattering (SBS) and can limit the power transmitted through a fiber or generated in a fiber if it is laser-active. Generally, such interference is limited to high-coherence light sources, i.e., typically those having spectral linewidths less than 100 MHz.

Due to the power limiting effects of SBS, it is generally desirable to suppress it as much as possible. In some cases, suppression has been effected by manipulating the acoustic waveguide properties of the fiber so as to minimize the interaction between optical signals and acoustic waves in the fiber. Since the optical fiber acts both as an acoustic waveguide and as an optical waveguide, it can generally be designed to suppress acoustic transport characteristics, i.e., reduce Stimulated Brillouin Scattering, while maintaining optical transport characteristics. In particular, the optical fiber can be designed (1) so as to increase acoustic waveguide transmission losses (i.e. waveguide attenuation), (2) such that the field distributions in the fiber for the optical and acoustic waves overlap as little as possible, which condition can be effected by manipulating physical boundaries of one or more layers of glass in a fiber, and (3) so as to result in the fiber having many weaker acoustic modes rather than a single very strong acoustic mode. Each of these methods can be utilized independently or in cooperation to suppress SBS.

BRIEF DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

DETAILED DESCRIPTION

Figure 1A:
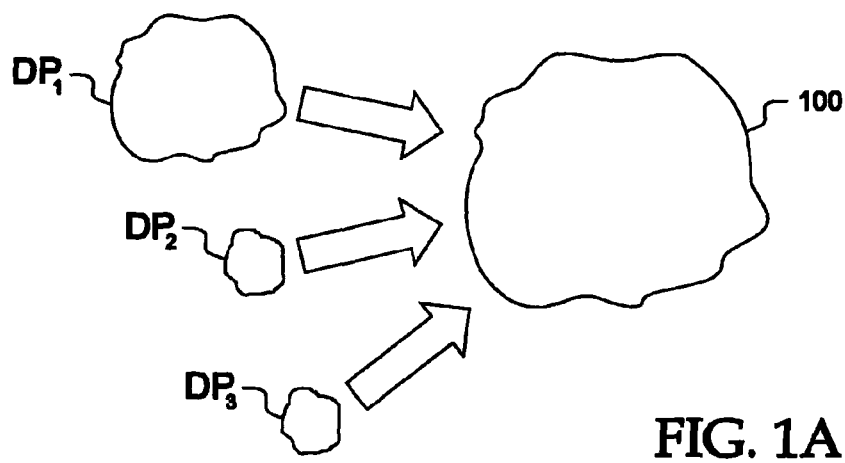
FIG. 1A is a drawing of various constituents mixed to form a composite material as described in various representative embodiments.

As shown in the drawings for purposes of illustration, novel techniques are disclosed herein for optical fibers having reduced Brillouin gain coefficients and a method for selecting materials in order to obtain such reduced Brillouin gain coefficient optical fibers. The Brillouin gain is a measure of the strength of the interaction between the acoustic wave and the optical wave. Previously techniques for reducing Brillouin gain coefficients have explicitly concentrated on adjusting the design parameters of the physical optical fiber and, except for the acoustic velocity, not on the fundamental physical acoustic properties of the material in the optical fiber. However, as has been pointed out, reducing the photoelastic constant of a fiber should also be attempted. The value of the photoelastic constant is an indication of the strength of the pressure that an optical wave can exert on a glass fiber. This pressure is the origin of SBS. Otherwise, methods previously used to reduce the Brillouin gain coefficient have neglected the actual material that is being used in the optical fiber. These methods use a net acoustic velocity profile, much like an optical refractive index profile. Typically the waveguiding properties are found, and then some value of the viscosity is assumed in order to have the model fit measured data. The origins of this viscosity value, or how it can be computed for a fiber containing a multitude of materials, are not addressed by current methods.

As disclosed herein in representative embodiments, other properties of the materials incorporated in an optical fiber, such as the acoustic damping of a material, also referred to herein as the acoustic attenuation, can be used to reduce Stimulated Brillouin Scattering (SBS). Acoustic attenuation is the attenuation of the sound wave itself due to the viscosity of the material, and is independent of the waveguiding properties of the fiber. The material acoustic damping loss (MADL) for the materials in the optical fiber or the associated Brillouin gain coefficient can be computed. MADL is inversely related to the Brillouin gain coefficient. In other words, the attenuation of the sound wave due to the viscosity of the material, is inversely related to the strength of the interaction between the acoustic wave and the optical wave. An increase in the MADL meaning a decrease in the Brillouin gain coefficient results in a reduction of the strength of SBS. Computed values of MADL or the Brillouin gain coefficient for various groups and/or concentrations of materials can thus be used to select particular materials and concentrations in the fabrication of optical fibers.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

In the following discussion, a model for the effect of one or more constituents (dopants) on the acoustic properties of a fiber will be disclosed. In representative embodiments, a method for the calculation of the Brillouin gain coefficient for a material which could be silica glass having multiple independent dopants and, in representative examples, a silica fiber with germanium oxide and boron oxide dopants are disclosed.

A generalized model is disclosed in the following for the calculation of the Brillouin parameters of an N-ary silica glass. This method includes a calculation of the shear and longitudinal acoustic velocities in an additive approach and the Brillouin spectral width. Knowledge of these parameters then enables the prediction of the Brillouin gain coefficient with subsequent accurate design and fabrication of Brillouin-tailored optical fiber. In this general model, N constituents are combined together into a composite material. In the case of a dominate material, the combined material comprises a host material and N−1 dopants. The combined material could also be spoken of as comprising N dopants (the N constituents) with the host material being the first dopant (the first constituent). Typically, the host material is silica ($SiO_2$). However, some newer fibers do not have a dominant species. The N constituents or host material and N−1 dopants are assumed to mix without incurring structural changes or defects resulting from co-doping that might influence these parameters.

Silica-based optical fibers are used in numerous applications. Whether utilitarian or deleterious, several of these applications include interactions between acoustic phonons and the optical wave. One such case is stimulated Brillouin scattering (SBS), which leads to a highly reflective distributed Bragg grating resulting from a propagating pressure wave, typically within the optical fiber core. SBS is in some cases useful, such as for distributed sensing and light amplification, while in other cases it is detrimental, such as in coherent telecommunications, and narrow linewidth fiber lasers. Optical fibers are, therefore, sometimes tailored simultaneously for both their optical and their acoustic waveguiding properties. Examples may include the tailoring of the magnitude of the scattering integral to suppress SBS. Other areas where an acoustically-tailored fiber may lead to new methodologies include slow light applications, or distributed sensing.

To design an optical waveguide, the affect on the index of refraction that the various constituents may have should be known. Such constituents could be, but are not limited to, $GeO_2$, $B_2O_3$, $Al_2O_3$, $P_2O_5$, and the like. Similarly, precise knowledge of a constituent's effect on the acoustic properties is needed in order to accurately design and manufacture an acoustically-tailored waveguide.

The velocity model disclosed herein is a modified form of the additive model presented, for example by Karapetyan, et al. in "Physical consequences of inhomogeneous glass structure from scattered light spectroscopy data," J. Non-Cryst. Solids 126, 93-102 (1990), which is herein incorporated by reference in its entirety. The following discussion discloses a method whereby this model can be used for multiple co-dopants. Germanium (Ge) and boron (B) dopants will be used in a numerical example. The model is fully extended to include a calculation of each of the acoustic velocities, index of refraction, Brillouin spectral width, and finally the Brillouin Gain Coefficient (BGC).

The model assumes that the incorporation of multiple constituents does not alter the bonding structure, i.e., the multiple constituents only mix. In some cases, such as aluminum oxide ($Al_2O_3$) and rare-earth (RE) co-doping, this assumption may not be valid. It is known that rare-earths such as Ytterbium (Yb) or Neodymium (Nd) have poor coordination in silica, and that the inclusion of alumina increases their solubility. As a result the aluminum oxide/rare-earth system may need to be treated as a single unit (or unit cell) in the present case.

For purposes of analysis, it is assumed that for N oxide constituents or components, the glass can be separated into N distinct volumes with each volume comprised of a pure constituent $DP_i$ for i=1 to N. The i-th constituent $DP_i$ is also referred to herein as the i-th dopant $DP_i$. Each volume is assumed to have a unit cross-section with the length of the i-th volume proportional to the concentration $D_i$ or abundance of its constituent $DP_i$. In a representative embodiment, host material comprises silica-based fibers are such that the first constituent $DP_1$ is $SiO_2$. Co-dopants or co-constituents could include, for example, $B_2O_3$ or $GeO_2$. An average acoustic velocity is found by dividing the total length by the total (acoustic) time-of-flight through all the segments. In addition, an average acoustic attenuation coefficient is computed by summing the attenuation coefficient in each segment with each attenuation coefficient weighted by its length. The Brillouin spectral width can then be determined. In an alternative embodiment, molar volumes and partial parameters can be used.

FIG. 1A is a drawing of various constituents $DP_1$,$DP_2$,$DP_3$ mixed to form a composite material 100 as described in various representative embodiments. The various constituents $DP_1$,$DP_2$,$DP_3$ are mixed at an appropriate temperature when the composite material 100 is created. This temperature is processing dependent and is intended herein to mean a temperature at which the various constituents $DP_1$,$DP_2$,$DP_3$ can be mixed so as to create the desired composite material 100. In a representative embodiment, the first constituent $DP_1$ can be the host material $DP_1$, also referred to herein as the base material $DP_1$, which could be silica. While a first, a second, and a third constituents $DP_1$,$DP_2$,$DP_3$ are shown in FIG. 1A, two constituents DP or more rather than the three constituents DP of FIG. 1A can also be used.

Figure 1B:
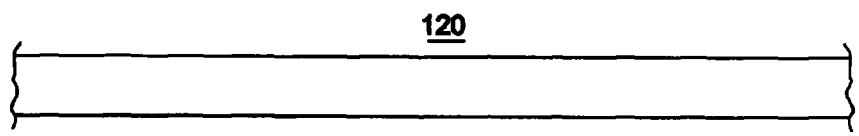
FIG. 1B is a drawing of a part of a transmission fiber fabricated from the composite material of FIG. 1A.

FIG. 1B is a drawing of a part of a transmission fiber 120 fabricated from the composite material 100 of FIG. 1A. In representative embodiments, the transmission fiber 120 is a solid tube of material that can act as a waveguide for electromagnetic radiation at optical or near optical frequencies. The transmission fiber 120 can be referred to as a transmission rod 120, a glass fiber 120, a glass rod 120, an optical fiber 120, an optical rod 120, or other appropriate term.

Figure 1C:
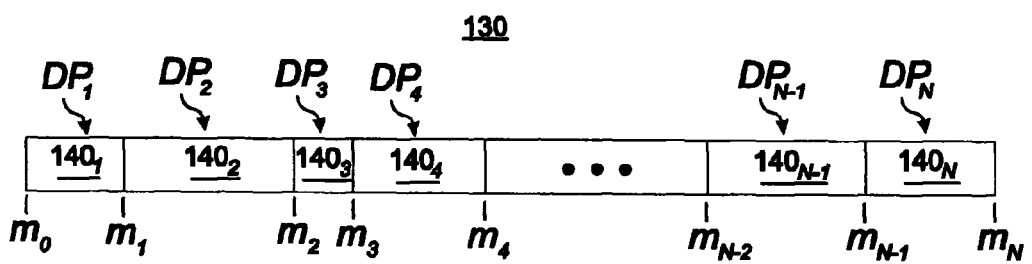
FIG. 1C is a drawing of a model rod representative of the constituents of the transmission fiber of FIG. 1B.

FIG. 1C is a drawing of a model rod 130 representative of the constituents of the transmission fiber 120 of FIG. 1B. The model rod 130 of FIG. 1C has a unity length and is divided into a total of N model segments 140 having one model segment 140 for each constituent DP of the transmission fiber 120. Each i-th segment $140_i$ has various associated parameters including a molar mass $M_i$, a mass density $\rho_i$, a longitudinal acoustic velocity $V_{Li}$, a shear acoustic velocity $V_{Si}$, a material attenuation coefficient $\alpha_i$, a photoelastic constant $p_{12}$, and an index of refraction $n_i$ that are characteristic of the constituent $DP_i$ comprising that segment. In general, these parameters are either identified in Table 1, computed in the following equations, or can be found in related literature. The length of each model segment 140 is representative of the molar content, i.e., the number of moles, in the model rod 130 of the constituent DP which corresponds to that segment 140. The i-th segment $140_i$ has its origin at location $m_{i-1}$ along the length of the model rod 130 and its termination at location $m_i$ from which it follows that $m_0=0$. For fibers having a dominate material and multiple dopants, the host material, which could be silica ($SiO_2$), is assigned the first position in FIG. 1C.

The molar content $D_i$ for the i-th constituent $DP_i$, i.e., the number of moles of the i-th constituent $DP_i$ in the model rod 130, can be obtained from Equation (1).

$$[D_i] = \frac{\frac{(m_i - m_{i-1})\rho_i}{M_i}}{\sum_{s=1}^{N} \frac{(m_s - m_{s-1})\rho_s}{M_s}} \tag{1}$$

Reorganization of Equation (1) results in Equation (2).

$$\left( \frac{(m_1 - m_0)\rho_1}{M_1} + \frac{(m_2 - m_1)\rho_2}{M_2} + \frac{(m_3 - m_2)\rho_3}{M_3} + \ldots + \frac{(m_N - m_{N-1})\rho_N}{M_N} \right)[ \tag{2}$$

$$D_i] = \frac{(m_i - m_{i-1})\rho_i}{M_i}$$

Equation (2) can be rearranged for i=1, to obtain Equation (3)

$$-\frac{m_0 \rho_1}{M_1}([D_1] - 1) + m_1\left(\frac{\rho_1}{M_1}([D_1] - 1) - \frac{\rho_2}{M_2}[D_1]\right) + \tag{3}$$
$$m_2\left(\frac{\rho_2}{M_2}[D_1] - \frac{\rho_3}{M_3}[D_1]\right) + \ldots + m_N \frac{\rho_N}{M_N}[D_1] = 0$$

and for i=N to obtain Equation (4).

$$-\frac{m_0 \rho_1}{M_1}[D_N] + m_1\left(\frac{\rho_1}{M_1}[D_N] - \frac{\rho_2}{M_2}[D_N]\right) + \tag{4}$$
$$m_2\left(\frac{\rho_2}{M_2}[D_N] - \frac{\rho_3}{M_3}[D_N]\right) + \ldots +$$
$$m_{N-1}\left(\frac{\rho_{N-1}}{M_{N-1}}[D_N] - \frac{\rho_N}{M_N}([D_N] - 1)\right) + m_N \frac{\rho_N}{M_N}([D_N] - 1) = 0$$

The set of such equations can then be cast into matrix form with $m_0=0$ to obtain Equation (5).

$$\begin{pmatrix} \left(\frac{\rho_1}{M_1}([D_1]-1) - \frac{\rho_2}{M_2}[D_1]\right) & \left(\frac{\rho_2}{M_2}[D_1] - \frac{\rho_3}{M_3}[D_1]\right) & \cdots & \left(\frac{\rho_{N-1}}{M_{N-1}}[D_1] - \frac{\rho_N}{M_N}[D_1]\right) & \left(\frac{\rho_N}{M_N}[D_1]\right) \\ \left(\frac{\rho_1}{M_1}[D_2] - \frac{\rho_2}{M_2}([D_2]-1)\right) & \left(\frac{\rho_2}{M_2}([D_2]-1) - \frac{\rho_3}{M_3}[D_2]\right) & \cdots & \left(\frac{\rho_{N-1}}{M_{N-1}}[D_2] - \frac{\rho_N}{M_N}[D_2]\right) & \left(\frac{\rho_N}{M_N}[D_2]\right) \\ \vdots & \vdots & \cdots & \vdots & \vdots \\ \left(\frac{\rho_1}{M_1}[D_{N-1}] - \frac{\rho_2}{M_2}[D_{N-1}]\right) & \left(\frac{\rho_2}{M_2}[D_{N-1}] - \frac{\rho_3}{M_3}[D_{N-1}]\right) & \cdots & \left(\frac{\rho_{N-1}}{M_{N-1}}([D_{N-1}]-1) - \frac{\rho_N}{M_N}[D_{N-1}]\right) & \left(\frac{\rho_N}{M_N}[D_{N-1}]\right) \\ \left(\frac{\rho_1}{M_1}[D_N] - \frac{\rho_2}{M_2}[D_N]\right) & \left(\frac{\rho_2}{M_2}[D_N] - \frac{\rho_3}{M_3}[D_N]\right) & \cdots & \left(\frac{\rho_{N-1}}{M_{N-1}}[D_N] - \frac{\rho_N}{M_N}([D_N]-1)\right) & \left(\frac{\rho_N}{M_N}([D_N]-1)\right) \end{pmatrix} \begin{pmatrix} m_1 \\ m_2 \\ \vdots \\ m_{N-1} \\ m_N \end{pmatrix} = 0 \tag{5}$$

Note that for a normalized unit-length model rod 130, $m_N=1$ and the rank of Equation (5) can be reduced by 1. As a representative example, assuming that N=3 ($m_3=1$), Equation (5) reduces in matrix form to Equation (6).

$$\begin{pmatrix} \left(\frac{\rho_1}{M_1}([D_1]-1) - \frac{\rho_2}{M_2}[D_1]\right) & \left(\frac{\rho_2}{M_2}[D_1] - \frac{\rho_3}{M_3}[D_1]\right) & \left(\frac{\rho_3}{M_3}[D_1]\right) \\ \left(\frac{\rho_1}{M_1}[D_2] - \frac{\rho_2}{M_2}([D_2]-1)\right) & \left(\frac{\rho_2}{M_2}([D_2]-1) - \frac{\rho_3}{M_3}[D_2]\right) & \left(\frac{\rho_3}{M_3}[D_2]\right) \\ \left(\frac{\rho_1}{M_1}[D_3] - \frac{\rho_2}{M_2}[D_3]\right) & \left(\frac{\rho_2}{M_2}[D_3] - \frac{\rho_3}{M_3}([D_3]-1)\right) & \left(\frac{\rho_3}{M_3}([D_3]-1)\right) \end{pmatrix} \begin{pmatrix} m_1 \\ m_2 \\ m_3 \end{pmatrix} = 0 \tag{6}$$

The three components of Equation (6) could be, for example, a germanium oxide ($GeO_2$) and boron oxide ($B_2O_3$) co-doped glass ($SiO_2$) fiber. Since, $m_3=1$, the third column in Equation (6) may be moved to the right hand side of the equation. To find $m_1$ and $m_2$, the first two rows are taken, reducing the rank from 3 to 2, resulting in Equation (7).

$$\begin{pmatrix} \left(\frac{\rho_1}{M_1}([D_1]-1) - \frac{\rho_2}{M_2}[D_1]\right) & \left(\frac{\rho_2}{M_2}[D_1] - \frac{\rho_3}{M_3}[D_1]\right) \\ \left(\frac{\rho_1}{M_1}[D_2] - \frac{\rho_2}{M_2}([D_2]-1)\right) & \left(\frac{\rho_2}{M_2}([D_2]-1) - \frac{\rho_3}{M_3}[D_2]\right) \end{pmatrix} \begin{pmatrix} m_1 \\ m_2 \end{pmatrix} = \tag{7}$$

$$\begin{pmatrix} -\left(\frac{\rho_3}{M_3}[D_1]\right) \\ -\left(\frac{\rho_3}{M_3}[D_2]\right) \end{pmatrix}$$

And therefore, $$\begin{pmatrix} m_1 \\ m_2 \end{pmatrix} = \begin{pmatrix} \left(\frac{\rho_1}{M_1}([D_1]-1) - \frac{\rho_2}{M_2}[D_1]\right) & \left(\frac{\rho_2}{M_2}[D_1] - \frac{\rho_3}{M_3}[D_1]\right) \\ \left(\frac{\rho_1}{M_1}[D_2] - \frac{\rho_2}{M_2}([D_2]-1)\right) & \left(\frac{\rho_2}{M_2}([D_2]-1) - \frac{\rho_3}{M_3}[D_2]\right) \end{pmatrix}^{-1} \quad (8)$$

$$\begin{pmatrix} -\left(\frac{\rho_3}{M_3}[D_1]\right) \\ -\left(\frac{\rho_3}{M_3}[D_2]\right) \end{pmatrix}$$

Note the symmetry in Equation (8). For selected first and second constituents $D_1$ and $D_2$ in the model rod 130, the corresponding first and second mass densities $\rho_1$ and $\rho_2$ and the corresponding first and second molar masses $M_1$ and $M_2$ are specified. Using these values and the values for the third mass density $\rho_3$ and the corresponding third molar mass $M_3$ for the model rod 130 the first and second locations $m_1$ and $m_2$ can be determined from Equation (8).

Once the coefficients $m_i$ are determined, the average acoustic velocity can be found by determining a total time of flight through the segmented model rod 130 shown in FIG. 1C. The average velocity is the unit length divided by the total time-of-flight which results in Equation (9) for the total longitudinal acoustic velocity $V_L$.

$$V_L = \left(\sum_{i=1}^{N} \frac{m_i - m_{i-1}}{V_{Li}}\right)^{-1} \quad (9)$$

The shear acoustic velocity $V_S$ is given by Equation (10).

$$V_S = \left(\sum_{i=1}^{N} \frac{m_i - m_{i-1}}{V_{Si}}\right)^{-1} \quad (10)$$

Values for the bulk materials may be found in published data sheets or the open literature. Alternatively, these quantities can be measured for bulk pure single-component glasses.

The mass density $\rho$ of the mixed transmission fiber 120 (composite material 100) can be determined from Equation (11).

$$\rho = \sum_{i=1}^{N} (m_i - m_{i-1})\rho_i \quad (11)$$

And, the net acoustic attenuation coefficient $\alpha$ at an acoustic frequency $v_a$ for the mixed transmission fiber 120 is given by Equation (12).

$$\alpha = (v_a/v_{ref})^2 \sum_{i=1}^{N} (m_i - m_{i-1})\alpha_i \quad (12)$$

The scaling term $(v_a/v_{ref})^2$ accounts for the frequency-squared dependence of the intrinsic linewidth as presented, for example by C. Krischer in "Optical Measurements of Ultrasonic Attenuation and Reflection Losses in Fused Silica," Journal of the Acoustical Society of America 48, 1086-1092 (1970), which is herein incorporated by reference in its entirety. The intrinsic linewidth is in turn proportional to the attenuation coefficient $\alpha$. As such, the attenuation coefficient $\alpha_i$ in each model segment 140$_i$ is defined to be the attenuation coefficient $\alpha_i$ at a reference frequency $v_{ref}$.

The Brillouin spectral width $\Delta v_B$ is the full width of the Brillouin gain spectrum (BGS) at the half maximum points and is related to the attenuation coefficient $\alpha$ and the acoustic velocity $V_L$ as found from Equation (9) by Equation (13).

$$\Delta v_B = \frac{V_L \alpha}{\pi} \quad (13)$$

Finally, the Brillouin gain coefficient $g_B$ at optical wavelength $\lambda$ can be found from Equation (14)

$$g_B = \frac{2\pi}{c\lambda^2 \rho} \frac{n^7 p_{12}^2}{V_L \Delta v_B} \quad (14)$$

where the index of refraction n has the value for the material, as described by C. R. Hammond et al. in "Silica based binary glass systems-refractive index behaviour and composition in optical fibres," Optical Quantum Electronics 5, 399-409 (1977), which is herein incorporated by reference in its entirety. Although the photoelastic constant $p_{12}$ is quite similar for several different oxides, it is assumed to be approximated by Equation (15) for the mixed transmission fiber 120.

$$p_{12} = \sum_{i=1}^{N} (m_i - m_{i-1}) p_{12i} \quad (15)$$

Note that Equation (14) is independent of the optical wavelength $\lambda$ for the bulk material according to the present analysis. However, there may be waveguide effects that lead to a wavelength-dependence in a fiber.

In addition, there may be dopants that diverge from the frequency-squared dependence of the acoustic attenuation, as is the case in Equation 12. This situation would then require a modification of Equation 12.

In the following representative example, germanium oxide ($GeO_2$, germanium dioxide) and boron oxide ($B_2O_3$, diboron trioxide) are selected as co-dopants in a silica fiber. Physical parametric data for the oxides of the two dopant elements as well as for silica can be found in or extrapolated from the literature. The material parameters used in the computations that follow for this representative example are found in Table 1. Table 1 lists values for germanium oxide ($GeO_2$), boron oxide ($B_2O_3$), and silica ($SiO_2$) of the following parameters: molar mass M, density $\rho$, longitudinal acoustic velocity $V_L$, attenuation coefficient $\alpha$, photoelastic constant $p_{12}$, and index of refraction n. For germanium oxide these parameters can be found in or extrapolated from data presented by R. E. Youngman et al. in "Extended structural integrity in network glasses and liquids,"

J. Non-Cryst. Solids 222, 190-198 (1997), which is herein incorporated by reference in its entirety and A. V. Anan'ev et al. in "Origin of Rayleigh scattering and anomaly of elastic properties in vitreous and molten $GeO_2$," Journal of Non-Crystalline Solids, vol. 354, pp. 3049-3058, 2008, which is herein incorporated by reference in its entirety. For boron oxide these parameters can be found in or extrapolated from data presented by C. R. Hammond et al. (op. cit.), by J. E. Masnik et al. in "The complex mechanical modulus as a structural probe: The case of alkali borate liquids and glasses", J. Chem. Phys. 103, 9907-9917 (1995), which is herein incorporated by reference in its entirety, and by A. V. Anan'ev et al. (op. cit.). For silica ($SiO_2$, silicon dioxide) these parameters can be found in or extrapolated from data presented by R. E. Youngman et al. (op. cit.).

TABLE 1

|  | $GeO_2$ | $B_2O_3$ | $SiO_2$ |
|---|---|---|---|
| Molar Mass (g/mol) [M] | 104.59 | 69.62 | 60.08 |
| Density ($kg/m^3$) [$\rho$] | 3650 | 1804 | 2200 |
| Longitudinal Acoustic Velocity (m/s) [$V_L$] | 3650 | 2350 | 5970 |
| Attenuation Coefficient (frequency = 11 GHz) ($m^{-1}$) [$\alpha$] | $1.069 \times 10^5$ | $1.855 \times 10^6$ | $1.159 \times 10^4$ |
| photoelastic constant [$p_{12}$] | 0.268 | 0.298 | 0.271 |
| Index of Refraction n ($\lambda = 1.534$ μm) [n] | 1.571 | 1.410 | 1.445 |

In this representative example, the values of Table 1 are assumed valid due to the rapid quenching experienced by the glass fiber in the draw tower. The fiber is drawn typically at a temperature on the order of 2000° C. and is cooled to room temperature in a few seconds. The resulting fiber is expected, therefore, to retain the physical parameters which the molten glass had at its elevated temperature.

Values for most of the parameters for the three oxides can be found in multiple places. In particular, the acoustic attenuation coefficient $\alpha$ of $B_2O_3$ was estimated using the following method. First, the imaginary part of the complex longitudinal modulus is extrapolated from the data of J. E. Masnik et al. (op. cit.) to be approximately 1.5 gigapascals (GPa) at a representative temperature of 1800° C. It is assumed that the Rayleigh contribution can be neglected in Equation (3) of J. E. Masnik et al. (op. cit.) which results in a calculated Brillouin spectral width of approximately 660 MHz at 514.5 nm. Invoking the frequency-squared dependence of the spectral width as reported in C. Krischer, the Brillouin linewidth is then estimated to be about 220 MHz at 1534 nm. Invoking the Bragg condition, which defines $\lambda_{acoustic} = \lambda_{optical}/(2n)$, the acoustic frequency at this optical wavelength in bulk $B_2O_3$ is 4.38 GHz. A reference frequency $\nu_{ref}$ of 11 GHz is assumed in Equation (12) which results in the attenuation coefficient $\alpha$ as in Table 1 through the use of Equation (13). The acoustic velocity can be found by extrapolating the real part of the complex modulus to a value of about 9.96 GPa using the disclosure of R. E. Youngman et al.

The MADL coefficient is dependent on the acoustic frequency. In general, if the MADL coefficient at one acoustic frequency is known, then it can be calculated for all acoustic frequencies. The reference acoustic frequency $\nu_{ref}$ is a frequency at which the MADL is known and quantified empirically. The value for this frequency can be arbitrarily selected and is taken herein as the value of the frequency corresponding to SBS in standard SMF-28™ at 1534 nm, or approximately 11 GHz. Using a reference frequency such as this enables a straight forward calculation of the Brillouin gain.

The pure, bulk attenuation $\alpha$ for germanium oxide at 11 GHz determined from the fit reported by P. D. Dragic in "Simplified model for effect of Ge doping on silica fibre acoustic properties", Electronics Letters, v 45, n 5, p 256-7, 26 Feb. 2009, which is herein incorporated by reference in its entirety, is used here. The selection of a reference value of 11 GHz is arbitrary but for this example is selected so as to be tied to the frequency of the $L_{01}$ acoustic mode (at 1534 nm) of Corning's fiber, SMF-28™ as reported by P. D. Dragic in "Brillouin Spectroscopy of Nd—Ge co-doped Silica Fibers," Journal of Non-Crystalline Solids 355, 403-413 (2009), which is herein incorporated by reference in its entirety. Although the Bragg condition in the bulk materials will lead to a different acoustic frequency for each material, the resulting mixed glass will have a fixed frequency which is the origin of the scaling factor in Equation (12).

Figure 2:
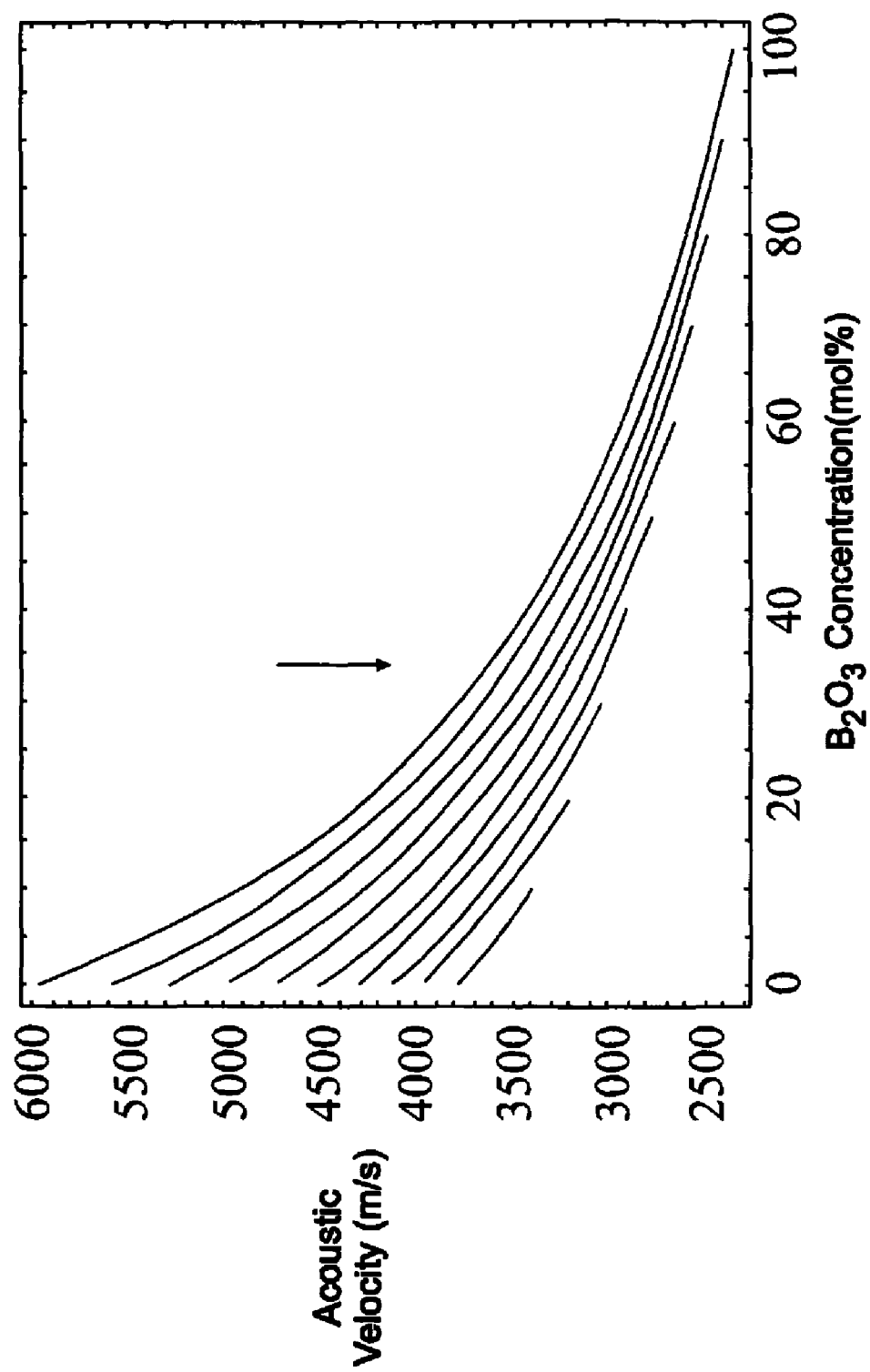
FIG. 2 is a plot of the longitudinal acoustic velocity of $B_2O_3:GeO_2:SiO_2$ glass vs. $B_2O_3$ for various concentrations of $GeO_2$ as described in various representative embodiments.

FIG. 2 is a plot of the longitudinal acoustic velocity of $B_2O_3$:$GeO_2$:$SiO_2$ glass vs. $B_2O_3$ for various concentrations of $GeO_2$ as described in various representative embodiments. The concentration of $GeO_2$ is varied from 0 to 90 mol % in increments of 10 mol %. The concentration of $GeO_2$ increases from the upper to the lower curves as indicated by the direction of the arrow in FIG. 2. The concentration of $SiO_2$, therefore, varies from 100 mol % to 0 mol %. In particular, the data point for $B_2O_3$=10 mol % and $GeO_2$=90 mol % is the limiting case wherein there is an absence of $SiO_2$ present in the glass.

Figure 3A:
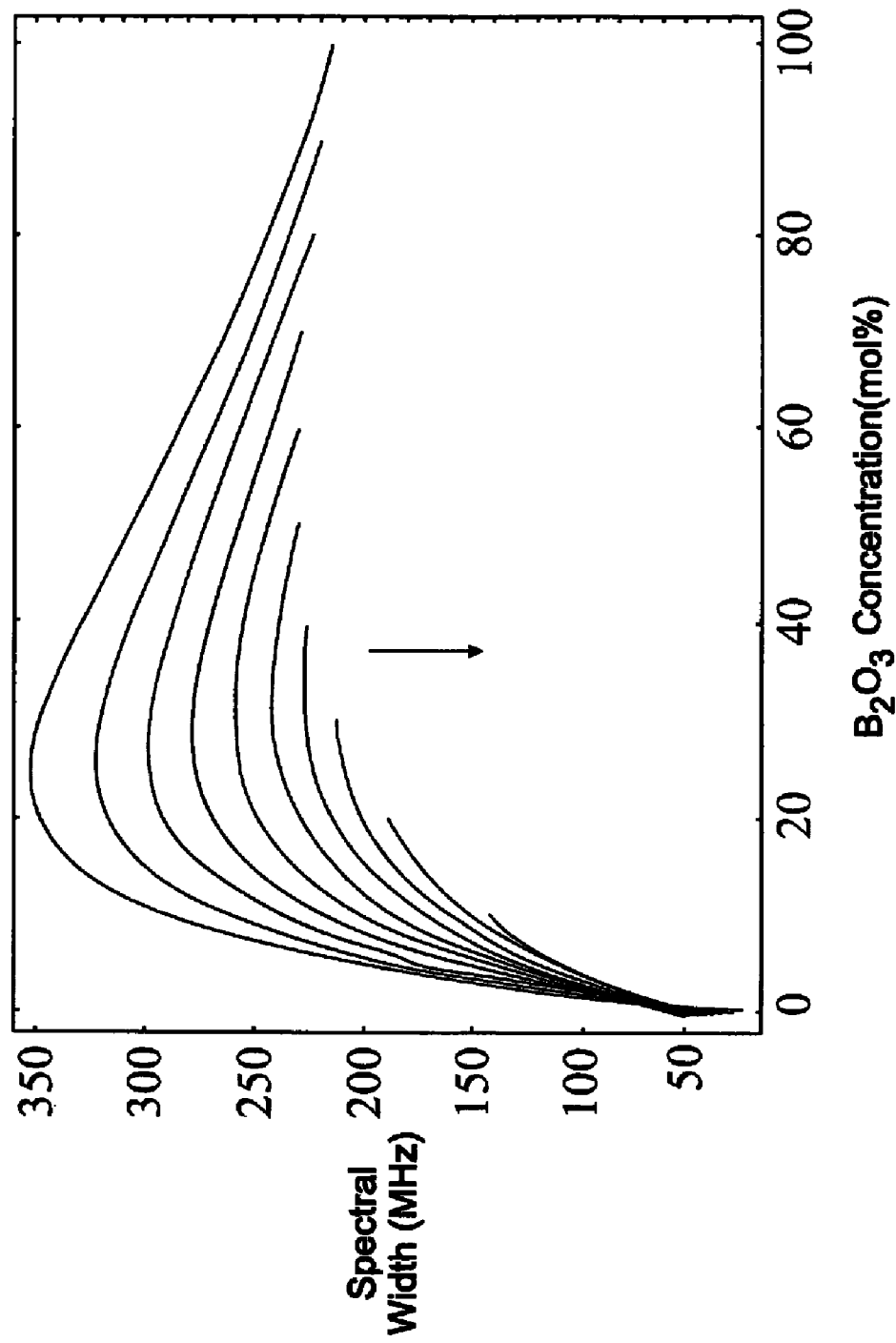
FIG. 3A is a plot of Brillouin spectral width vs. the concentration of $B_2O_3$ for various values of the concentration of $GeO_2$ as described in various representative embodiments.

FIG. 3A is a plot of Brillouin spectral width vs. the concentration of $B_2O_3$ for various values of the concentration of $GeO_2$ as described in various representative embodiments. The computed values of the plot of FIG. 3A are for a vacuum optical wavelength of 1534 nm. The concentration of $GeO_2$ increases from the upper to the lower curves as indicated by the direction of the arrow in FIG. 3A.

Figure 3B:
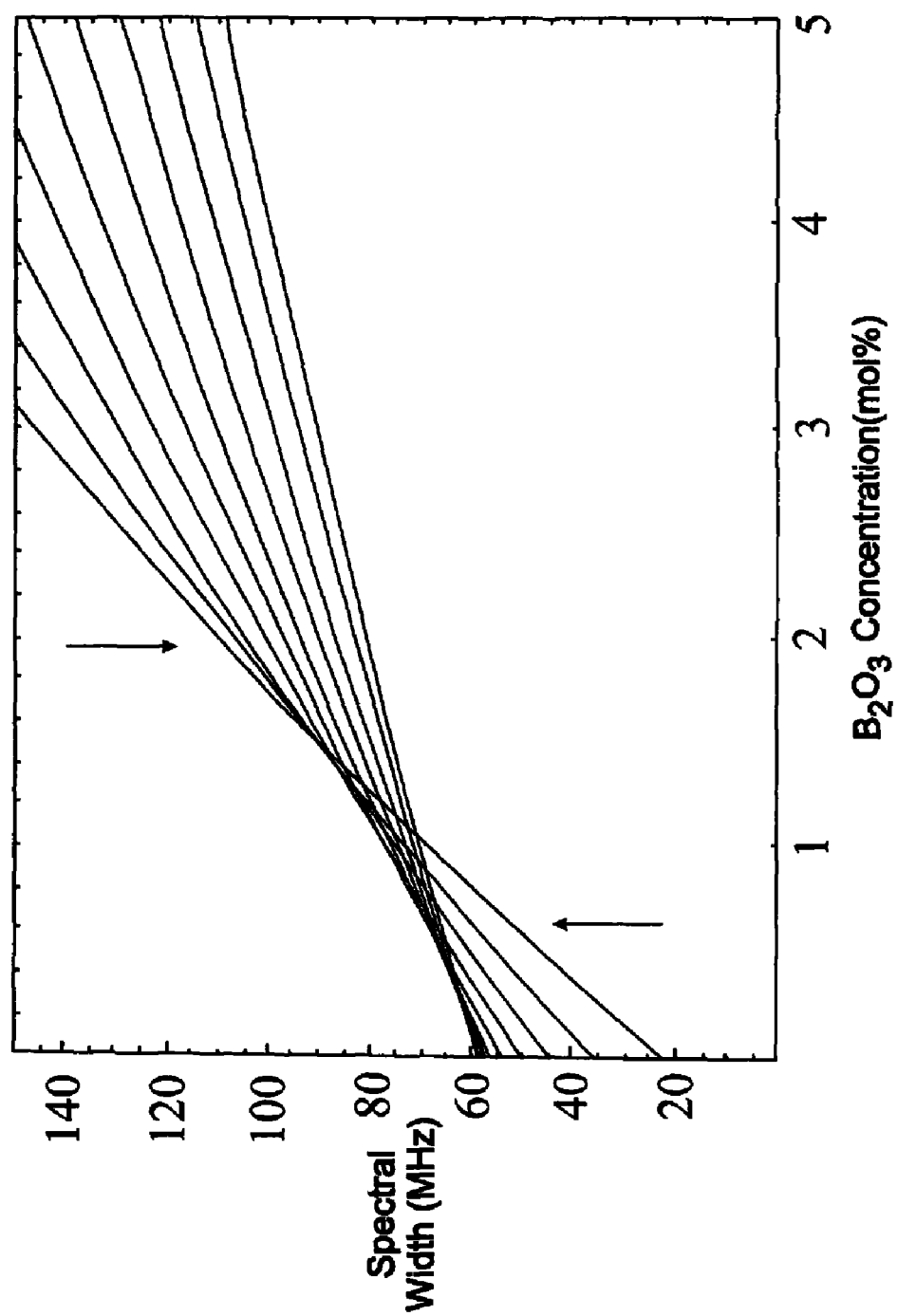
FIG. 3B is another plot of Brillouin spectral width vs. the concentration of $B_2O_3$ for various values of the concentration of $GeO_2$ as described in various representative embodiments.

FIG. 3B is another plot of Brillouin spectral width vs. the concentration of $B_2O_3$ for various values of the concentration of $GeO_2$ as described in various representative embodiments. The computed values of the plot of FIG. 3B are for a vacuum optical wavelength of 1534 nm. The plot of FIG. 3B is for a limited range and domain of that shown in FIG. 3A. The concentration of $GeO_2$ increases as indicated by the directions of the arrows in FIG. 3B. The spectral width is found to reach a maximum value at approximate concentrations of $GeO_2$=0 mol % and $B_2O_3$=25 mol %.

As shown in FIGS. 3A and 3B, the spectral width does not monotonically or linearly increase with the concentration of $B_2O_3$. Nor does the spectral width increase for low concentrations of $GeO_2$. The initial broadening of the Brillouin spectrum, with increasing $B_2O_3$ starting from 0 mol %, arises due to the fact that $B_2O_3$ has a substantially larger acoustic attenuation coefficient $\alpha$ as compared with that of $SiO_2$ at the same acoustic frequency. However, the spectral width begins a decline after a particular value for the concentration of $B_2O_3$, due to the decreasing acoustic velocity with increasing concentration of $B_2O_3$. This condition results in a decreasing acoustic frequency (due to the Bragg condition) and therefore a decreasing acoustic attenuation coefficient α as reported in C. Krischer (op,cit.). Eventually, the frequency-squared dependence of the acoustic attenuation (material damping) overtakes the system, and the spectral width begins to decrease with increasing $B_2O_3$.

Figure 4A:
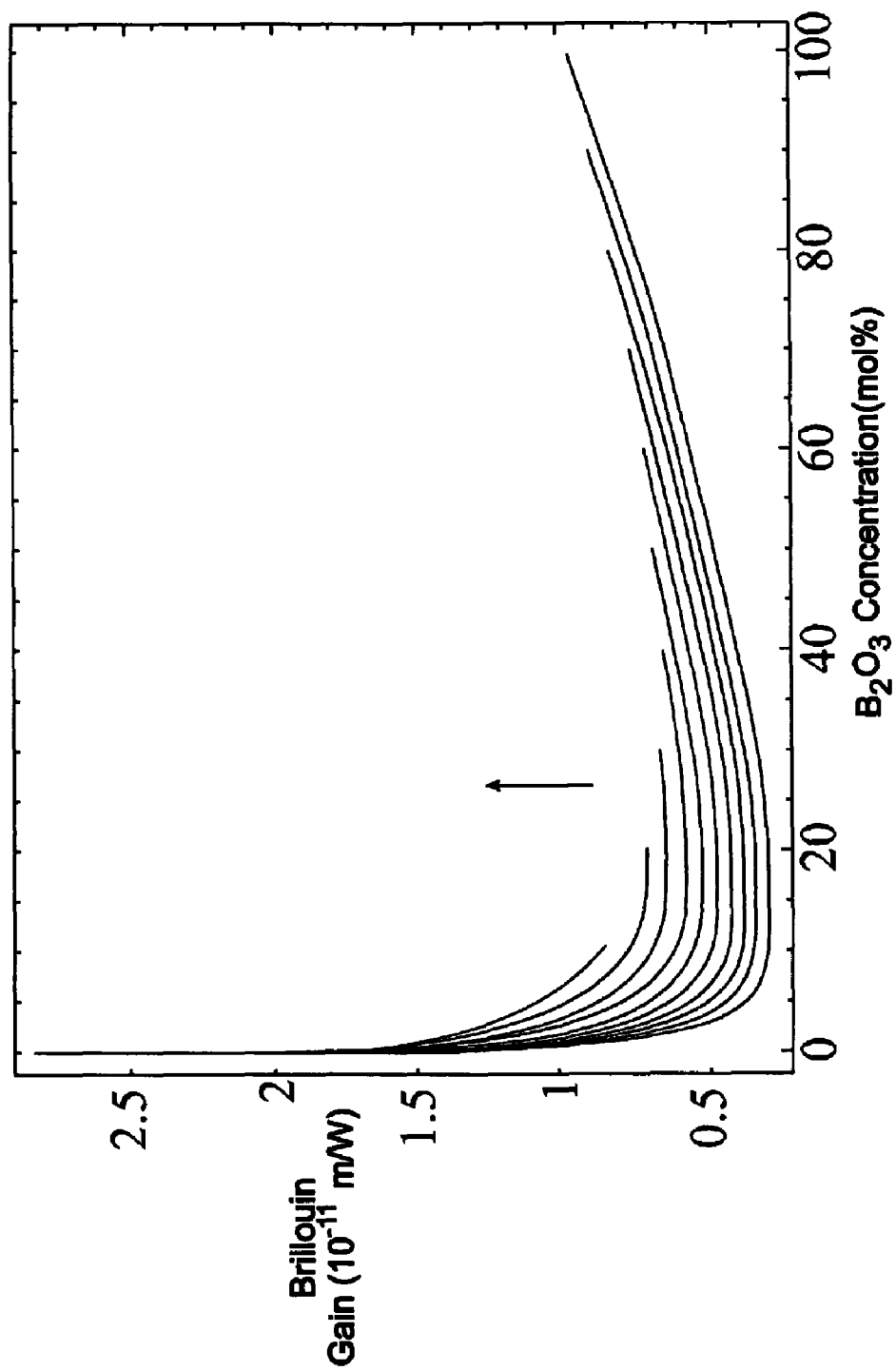
FIG. 4A is a plot of computed values of the Brillouin Gain Coefficient vs. the concentration of $B_2O_3$ for various values of the concentration of $GeO_2$ as described in various representative embodiments.

FIG. 4A is a plot of computed values of the Brillouin Gain Coefficient vs. the concentration of $B_2O_3$ for various values of the concentration of $GeO_2$ as described in various representative embodiments. The computed values of the plot of FIG. 4A are for a vacuum optical wavelength of 1534 nm. The concentration of $GeO_2$ increases from the lower to the upper curves as indicated by the direction of the arrow in FIG. 4A.

Figure 4B:
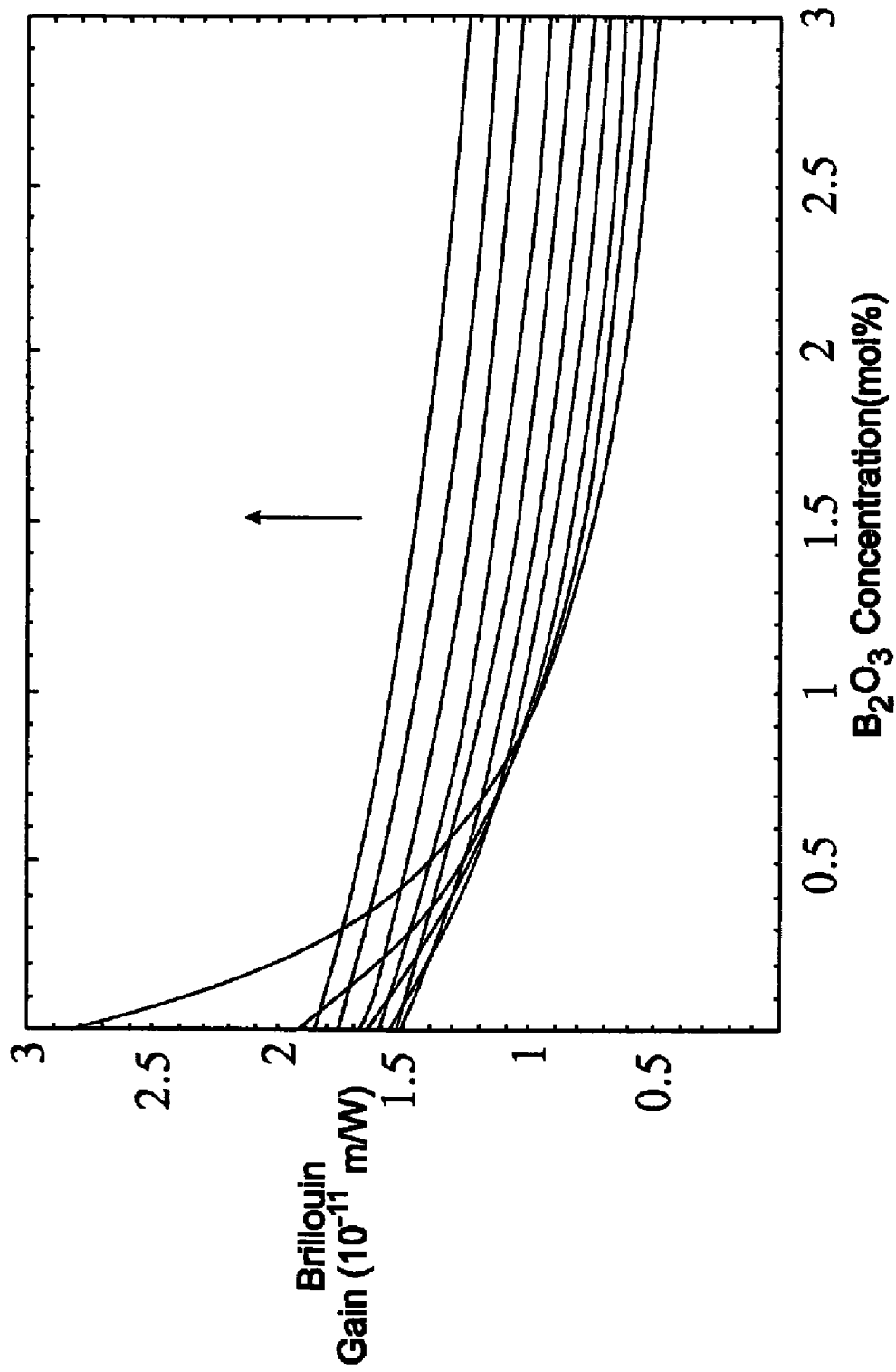
FIG. 4B is another plot of computed values of the Brillouin Gain Coefficient vs. the concentration of $B_2O_3$ for various values of the concentration of $GeO_2$ as described in various representative embodiments.

FIG. 4B is another plot of computed values of the Brillouin Gain Coefficient vs. the concentration of $B_2O_3$ for various values of the concentration of $GeO_2$ as described in various representative embodiments. The computed values of the plot of FIG. 4B are for a vacuum optical wavelength of 1534 nm. The concentration of $GeO_2$ increases from the lower to the upper curves as indicated by the direction of the arrow on the left side of FIG. 4A. The plot of FIG. 4B is for a limited range and domain of that shown in FIG. 4A. However, these curves are independent of the wavelength for the material alone.

For the same arguments as above, the decreasing acoustic velocity and acoustic frequency with increasing $B_2O_3$ eventually overtakes the large acoustic damping α in $B_2O_3$ glass. This condition results in a minimum value of the Brillouin gain. These computations demonstrate that the minimum value of the Brillouin gain coefficient is found at approximately a concentration of $GeO_2=0$ mol % and at approximately a concentration of $B_2O_3=14$ mol %. The computed BGC value of $0.28\times10^{-11}$ m/W is approximately ten times lower than the computed value for pure silica. These calculations assume polarized light.

The techniques disclosed above are useful in the following representative example which use dopants, such as $B_2O_3$ and the like, with large acoustic attenuation coefficients α to design and manufacture low-SBS fibers. Using a material with a large degree of material damping can result in a low-SBS fiber.

Figure 5:
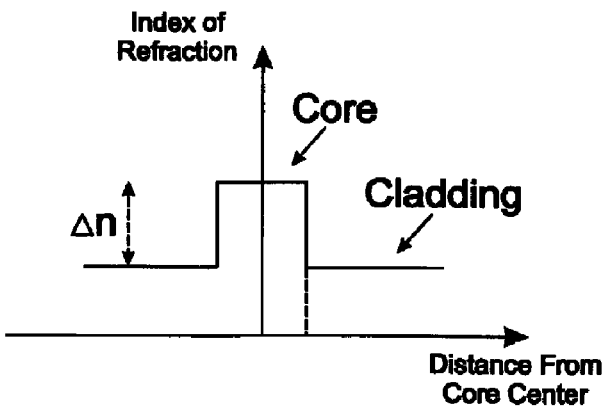
FIG. 5 is a representation of a cross section of a step-indexed fiber as described in various representative embodiments.

FIG. 5 is a representation of a cross section of a step-indexed fiber as described in various representative embodiments. In FIG. 5, the index of refraction n for the core and clad layers is plotted vs. the distance from the center of the core of the fiber.

Figure 6:
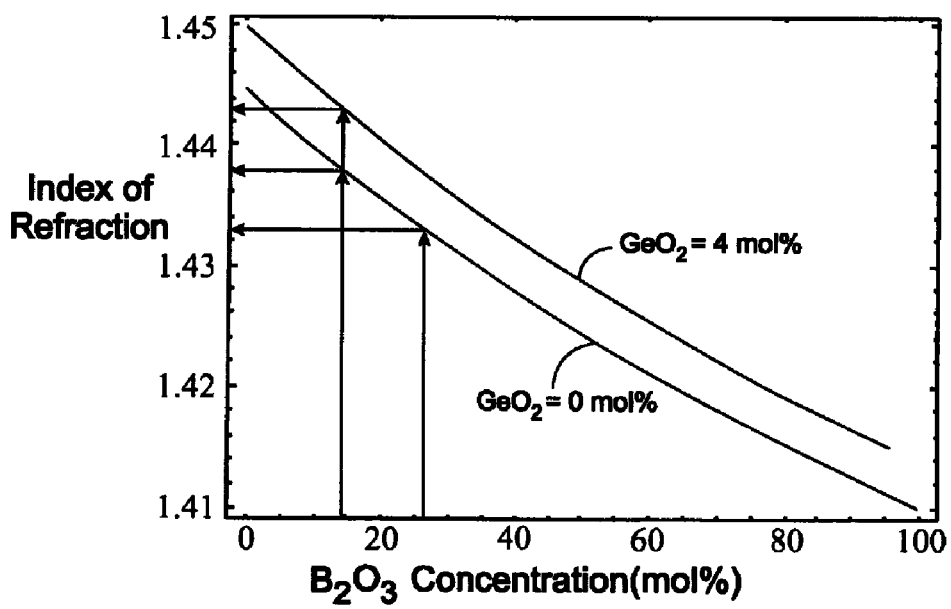
FIG. 6 is a plot of the index of refraction vs. the concentration of $B_2O_3$ for two concentrations of $GeO_2$ as described in various representative embodiments.

FIG. 6 is a plot of the index of refraction vs. the concentration of $B_2O_3$ for two concentrations of $GeO_2$ as described in various representative embodiments. The lower curve of FIG. 6 is for a zero concentration of $GeO_2$, and the upper curve of FIG. 6 is for a concentration of $GeO_2$ of 4 mol %. Both the lower and the upper curves are for a vacuum optical wavelength of 1534 nm. Since a minimum value for Brillouin Gain Coefficient $g_B$ is found at an approximate $B_2O_3$ concentration of 14 mol % and an approximate $GeO_2$ concentration of 0 mol %, the core material is selected to have these compositions. In selecting a cladding, the index of refraction is plotted as a function of the concentration of $B_2O_3$ without $GeO_2$ which is the lower curve shown in FIG. 6, assuming that $$n = \sum_{i=1}^{N} (m_i - m_{i-1})n_i$$

as reported by G. O. Karapetyan et al. (op. cit.). In order to achieve an index difference of about 0.35% (the numerical aperture ≈0.12 which is similar to that of SMF-28™), the cladding should have a $B_2O_3$ concentration of 27 mol % and a $GeO_2$ concentration of 0 mol %. In this case, the Brillouin Gain Coefficient $g_B=0.28\times10^{-11}$ m/W for the material. Waveguiding effects should also be considered in the fiber design, but these effects are not expected to significantly change the present results. The numerical aperture (NA) of a step index fiber is defined to be $NA=\sqrt{n_{core}^2-n_{clad}^2}$ where $n_{core}$ is the index of refraction of the core and $n_{clad}$ is the index of refraction of the cladding.

The contrast in $B_2O_3$ concentration from core-to-cladding can be reduced if a concentration of $GeO_2=4$ mol % is added to the core. This condition corresponds to the upper curve in FIG. 6. In this case, the concentration of $B_2O_3$ is 14 mol % and the concentration of $GeO_2$ is 4 mol %. However, a concentration for $B_2O_3$ of 14 mol % and a concentration for $GeO_2$ of 0 mol % could also be chosen for the cladding to obtain an NA of about 0.12. This selection results in only a slight increase in $g_B$ to $0.29\times10^{-11}$ m/W. These values of the BGC are close to ten times lower than that for SMF-28™ which value is reported by P. D. Dragic in "Low SBS Passive Optical Fibers for Fiber Laser Pigtails, Components, and Power Delivery," as presented at Photonics West 2009, Proc. SPIE, vol. 7195 71852L (2009). With a knowledge of the dopant effects on the acoustic properties of silica, a fiber with reduced SBS can be designed using the above techniques. The fiber cross section may also be manipulated to reduce the scattering integral to further suppress SBS. Instead of a step-index clad to core fiber, a graded-index clad surrounding the fiber core could also be used.

The techniques disclosed above are also useful in the following representative example in which materials such as those described above can act as high-damping buffer layers between boundaries or regions in an acoustic fiber. In particular, boron-doped silica may also be used as that damping layer. In this representative example, an index-matched cladding layer to pure silica is obtained. However, as will be apparent to one of ordinary skill in the art it is not a requirement that the cladding layer must be a matched-index layer.

Figure 7:
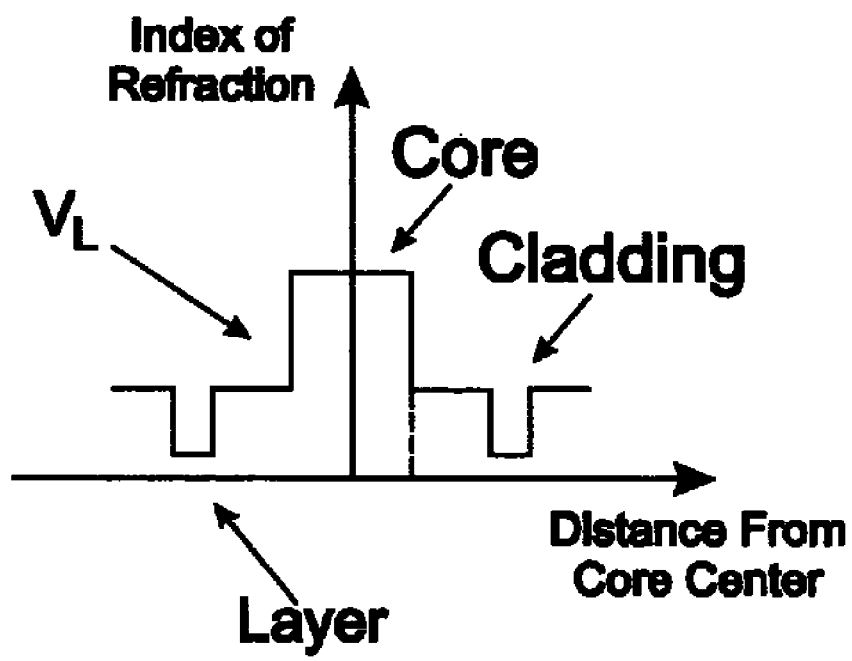
FIG. 7 is a drawing of a cross-section of a low-SBS fiber with an acoustic damping layer as described in various representative embodiments.

FIG. 7 is a drawing of a cross-section of a low-SBS fiber with an acoustic damping layer as described in various representative embodiments. In FIG. 7, the index of refraction n for the core and clad layers is plotted vs. the distance from the center of the core of the fiber. For fibers with small claddings, the cladding-to-buffer interface may play a role in SBS as reported by P. J. Thomas et al. in "Normal acoustic modes and Brillouin scattering in single-mode optical fibers," Phys. Rev. B 19, 4986-4998 (1979), which is herein incorporated by reference in its entirety. To de-couple the core interaction from this interface a heavily-damping layer can be inserted in any location between the core and the location of the cladding-to-buffer boundary. Alternatively, this layer can be used to suppress SBS in low-SBS fibers that are limited by interactions between the tails of the optical field and cladding acoustic waves as reported by P. D. Dragic in the above cited paper "Low SBS Passive Optical Fibers for Fiber Laser Pigtails, Components, and Power Delivery", wherein the interaction in the core has been reduced to below that of the cladding.

As a particular representative example, an acoustic attenuation coefficient α can be obtained using Equation (12) that is elevated at a wavelength of 1534 nm. A value of $2.91\times10^5$ m$^{-1}$ is obtained for a concentration of $B_2O_3=50$ mol % and the concentration of $GeO_2=15$ mol % which also results in an index of refraction that is roughly matched to the pure silica cladding. The $e^{-1}$ distance is then about 3.4 μm. Thus, the round-trip (double-pass) loss of a 10-micron layer of this material is more than 25 dB, rendering it an effective acoustic isolation layer. Instead of a step-index high-damping buffer layer between boundaries or regions in an acoustic fiber, a graded-index high-damping buffer layer between boundaries or regions in an acoustic fiber could also be used.

A model and method are disclosed herein which can be used to compute acoustic parameters, including the BGC for a silica fiber with N−1 co-dopants. The special case of $GeO_2$ and $B_2O_3$ co-doped silica (N=3) was presented. It is noted that the values used herein are approximated from numbers found in the literature which may have introduced some errors. Any such errors can be reduced by characterizing $GeO_2$ and $B_2O_3$ doped fibers for a specific manufacturer or manufacturing process.

It has been demonstrated herein that with an accurate knowledge of the dopant effects on the acoustic properties of silica, fiber structures having desired properties can be designed. In particular, it has been disclosed a method by which a low-SBS $B_2O_3$:$GeO_2$ co-doped silica fiber, where the reduction in the Brillouin gain results from an increase in material damping relative to silica fibers doped with Ge alone can be designed. In another example, a highly-attenuating acoustic-isolation layer that can be incorporated into acoustically-tailored optical fibers was designed.

Figure 8:
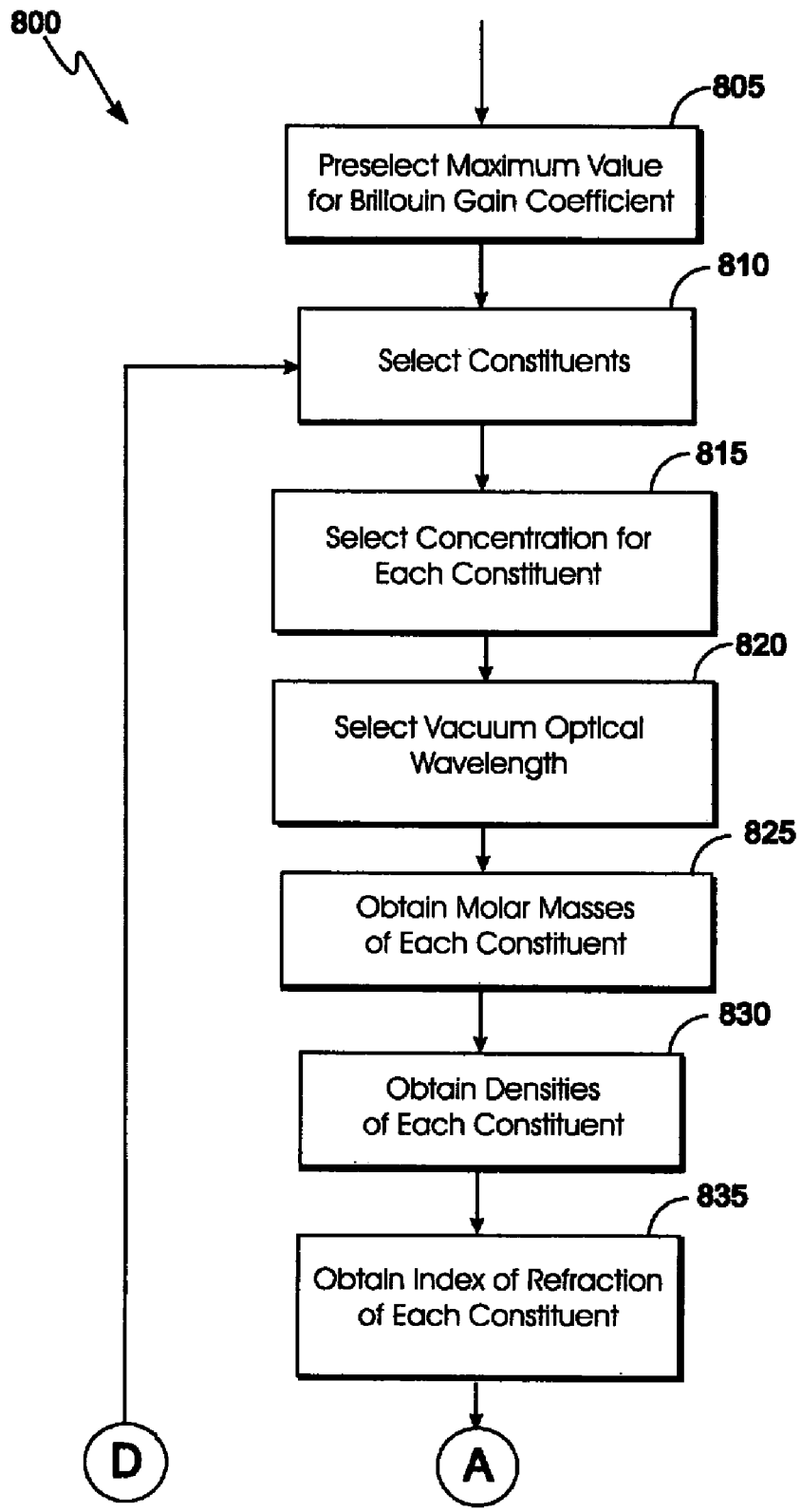
FIG. 8 is a flowchart of a method for creating a composite material having a Brillouin Gain Coefficient less than a preselected value as described in various representative embodiments.
Figure 8:
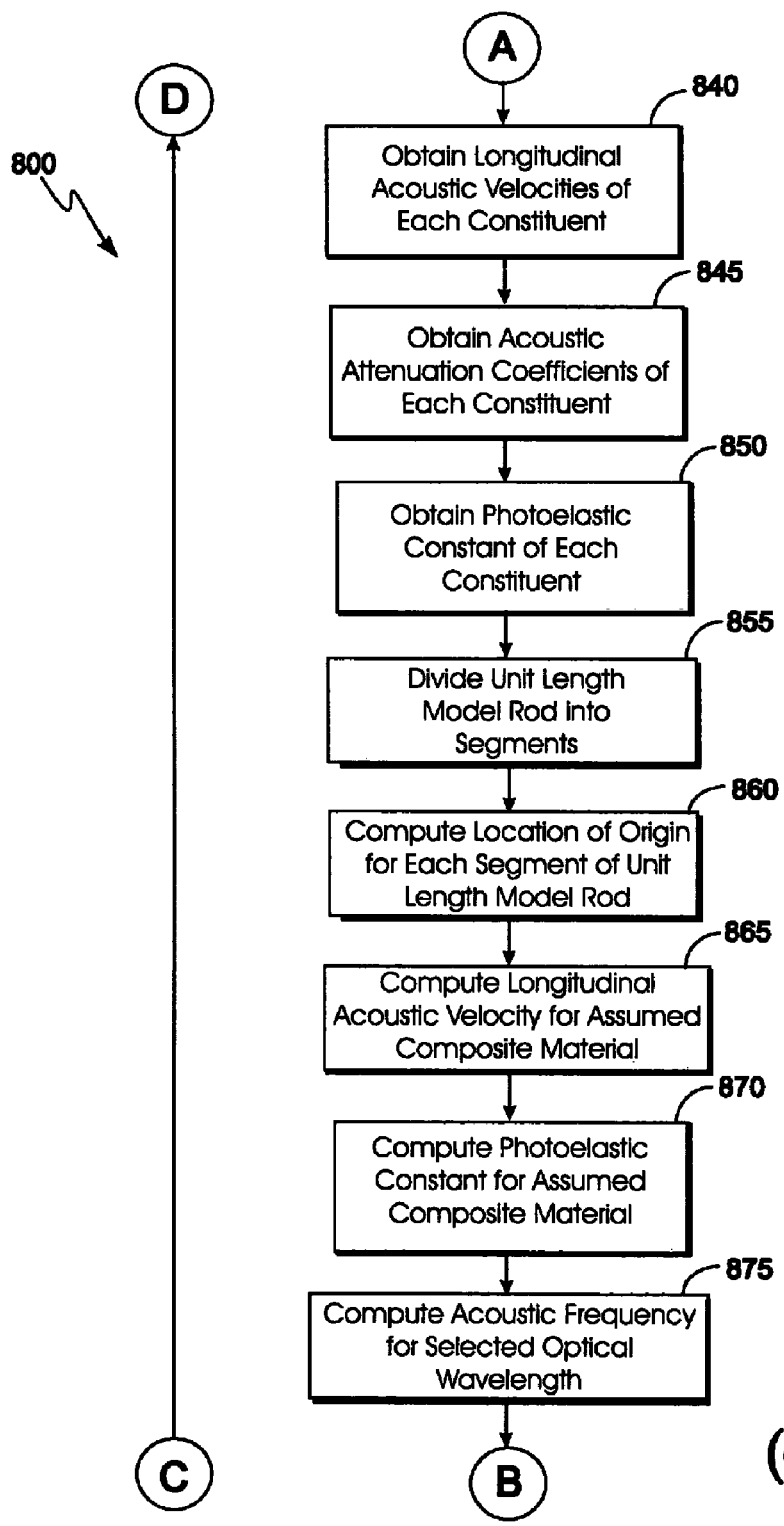
Figure 8:
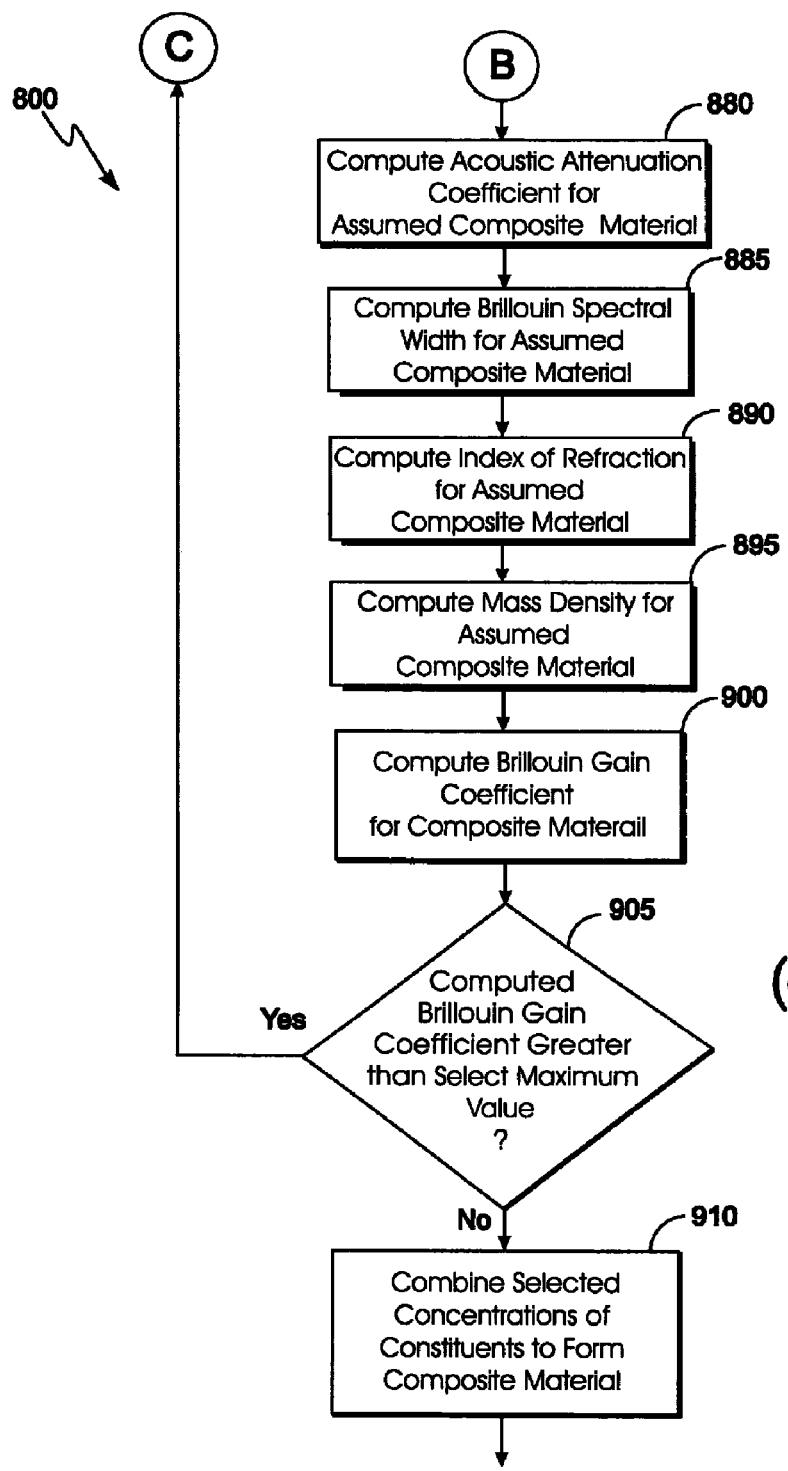

FIG. 8 is a flowchart of a method 800 for creating a composite material 100 having a Brillouin Gain Coefficient less than a preselected value as described in various representative embodiments. The composite material 100 comprises N constituents which could include a host material $DP_1$ (first constituent $DP_1$) and one or more other constituents DP (dopants DP). The host material $DP_1$ or first constituent $DP_1$ could be, for example, silica ($SiO_2$) or other appropriate material, and the other constituents DP could be, for example, $GeO_2$, $B_2O_3$, $Al_2O_3$, $P_2O_5$, or other appropriate materials either singularly or in any of various appropriate combinations. The order of the steps in the method 800 is not constrained to that shown in FIG. 8 or described in the following discussion. Several of the steps could occur in a different order without affecting the final result. In block 805, a maximum value for the Brillouin Gain Coefficient is selected. Block 805 then transfers control to block 810.

In block 810, the constituents DP are selected. Block 810, then transfers control to block 815.

In block 815, the concentration of each constituent DP including any host constituent $DP_1$ is selected. Block 815, then transfers control to block 820.

In block 820, a vacuum optical wavelength (or a central wavelength of a range of wavelengths) is selected. Block 820 then transfers control to block 825.

In block 825, the molar masses M of each constituent DP including any host constituent $DP_1$ are obtained. Block 825, then transfers control to block 830.

In block 830, the densities p of each constituent DP including any host constituent $DP_1$ are obtained. Block 830, then transfers control to block 835.

In block 835, the index of refraction n of each constituent DP including any host constituent $DP_1$ is obtained. Block 835, then transfers control to block 840.

In block 840, the longitudinal acoustic velocities $V_{Li}$ of each constituent DP including any host constituent $DP_1$ is obtained. Block 840, then transfers control to block 845.

In block 845, the acoustic attenuation coefficients α of each constituent DP including any host constituent $DP_1$ is obtained. Block 845, then transfers control to block 850.

In block 850, the photoelastic constant $p_{12}$ of each constituent DP including any host constituent $DP_1$ is obtained. Block 850, then transfers control to block 855.

In block 855, the unit length model rod m is conceptually divided into segments 140. Block 855, then transfers control to block 860.

In block 860, the location of origin $m_{i-1}$ of each segment 140, for the N segments in the unit length model rod 130. Since the model rod 130 has unit length, $m_N$ equals one. The length of each model segment 140 is representative of the molar content, i.e., the number of moles, in the model rod 130 of the constituent DP which corresponds to that segment 140. Block 860, then transfers control to block 865.

In block 865, the longitudinal acoustic velocity $V_L$ for the assumed composite material 100 is computed using Equation 9. Block 865, then transfers control to block 870.

In block 870, the photoelastic constant $p_{12}$ of the assumed composite material 100 is computed using Equation 15. Block 870, then transfers control to block 875.

In block 875, the acoustic frequency $v_a$ for the selected optical wavelength is computed for each constituent DP using the Bragg condition. Block 875 then transfers control to block 880.

In block 880, the attenuation coefficient α for the assumed composite material 100 is computed using Equation 12. Block 880, then transfers control to block 885.

In block 885, the Brillouin Spectral Width $\Delta v_B$ of the assumed composite material 100 is computed using Equation 13. Block 885, then transfers control to block 890.

In block 890, the index of refraction n of the assumed composite material 100 is computed. The index of refraction n can be computed using a Sellemeier treatment as reported by C. R. Hammond (op. cit.). Block 890, then transfers control to block 895.

In block 895, the mass density ρ of the assumed composite material 100 is computed using Equation 11. Block 895, then transfers control to block 900.

In block 900, the Brillouin Gain Coefficient $g_B$ of the assumed composite material 100 is computed using Equation 14. Block 900, then transfers control to block 905.

If the computed Brillouin Gain Coefficient $g_B$ of the assumed composite material 100 is greater than the preselected maximum value for the Gain Coefficient $g_B$, block 905 transfers control back to block 810. Otherwise, block 905 transfers control to block 910.

In block 910, the selected concentrations D of the constituents DP including the host constituent $DP_1$ are combined at an appropriate temperature to form the composite material 100. Block 910 then terminates the process.

While the above representative embodiment has been described in terms of boron oxide ($B_2O_3$) and germanium oxide ($GeO_2$) doped silica ($SiO_2$) glass for optical fibers, it will be understood by one of ordinary skill in the art that other representative embodiments can be implemented using different dopants with or without different host materials. Further, while the discussion has been in terms of optical frequencies, it will be understood by one of ordinary skill in the art that frequencies other than those in the visible spectrum can be used without significant changes in the teachings and uses disclosed herein.

In a representative embodiment, a method 800 for creating a composite material 100 for fabricating an optical fiber 120 is disclosed. The method 800 comprises selecting multiple constituents DP and a concentration D for each constituent DP, obtaining values for various physical parameters for each constituent DP, and conceptually dividing a unit length model rod 130 into a number N of segments 140. The number N equals the number of constituents DP, and each segment 140 is associated with a separate one of the constituents DP. The method 800 further comprises computing origin locations m for the segments 140, computing a longitudinal acoustic velocity $V_L$ for an assumed composite material 100 created at an appropriate temperature using above values, computing a photoelastic constant $p_{12}$ for the assumed composite material 100 using above values, computing an acoustic frequency $v_a$ for the assumed composite material 100 using above values, computing an acoustic attenuation coefficient $\alpha$ for the assumed composite material 100 using above values, and computing a Brillouin Spectral Width $\Delta v_B$ for the assumed composite material 100 using above values, computing a Brillouin Gain Coefficient $g_B$ for the assumed composite material 100 using above values. if the computed Brillouin Gain Coefficient $g_B$ is greater than a preselected value, repeating the above, otherwise, mixing the constituents DP at an appropriate temperature.

In another representative embodiment, an optical fiber 120 is disclosed. The optical fiber 120 comprises multiple constituents DP. Each constituent DP has a concentration D. The constituents DP and their associated concentrations D are selected by obtaining values for various physical parameters for each constituent DP, conceptually dividing a unit length model rod 130 into a number N of segments 140. The number N equals the number of constituents DP, and each segment 140 is associated with a separate one of the constituents DP. The constituents DP and their associated concentrations D are further selected by computing origin locations m for the segments 140, computing a longitudinal acoustic velocity $V_L$ for an assumed composite material 100 created at an appropriate temperature using above values, computing a photoelastic constant $p_{12}$ for the assumed composite material 100 using above values, computing an acoustic frequency $v_a$ for the assumed composite material 100 using above values, computing an acoustic attenuation coefficient $\alpha$ for the assumed composite material 100 using above values, computing a Brillouin Spectral Width $\Delta v_B$ for the assumed composite material 100 using above values, and computing a Brillouin Gain Coefficient $g_B$ for the assumed composite material 100 using above values. If the computed Brillouin Gain Coefficient $g_B$ is greater than a preselected value, the constituents DP and their associated concentrations D are reselected and the above procedures are repeated, otherwise, the constituents DP are mixed at an appropriate temperature.

In still another representative embodiment, a means 800 for creating a composite material 100 for fabricating an optical fiber 120 is disclosed. The means 800 comprises means for selecting multiple constituents DP and a concentration D for each constituent DP, means for obtaining values for various physical parameters for each constituent DP, means for conceptually dividing a unit length model rod 130 into a number N of segments 140 wherein the number N equals the number of constituents DP and wherein each segment 140 is associated with a separate one of the constituents DP, means for computing origin locations m for the segments 140, means for computing a longitudinal acoustic velocity $V_L$ for an assumed composite material 100 created at an appropriate temperature using above values, means for computing a photoelastic constant $p_{12}$ for the assumed composite material 100 using above values, means for computing an acoustic frequency $v_a$ for the assumed composite material 100 using above values, means for computing an acoustic attenuation coefficient $\alpha$ for the assumed composite material 100 using above values, means for computing a Brillouin Spectral Width $\Delta v_B$ for the assumed composite material 100 using above values, and means for computing a Brillouin Gain Coefficient $g_B$ for the assumed composite material 100 using above values. if the computed Brillouin Gain Coefficient $g_B$ is greater than a preselected value, means for repeating the above, otherwise, means for mixing the constituents DP at an appropriate temperature.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method for creating a composite material for fabricating an optical fiber, comprising:
   selecting multiple constituents and a concentration for each constituent;
   obtaining values for various physical parameters for each constituent;
   conceptually dividing a unit length model rod into a number of segments, wherein the number equals the number of constituents and wherein each segment is associated with a separate one of the constituents;
   computing origin locations for the segments;
   computing a longitudinal acoustic velocity for an assumed composite material created at an appropriate temperature using above values;
   computing a photoelastic constant for the assumed composite material using above values;
   computing an acoustic frequency for the assumed composite material using above values;
   computing an acoustic attenuation coefficient for the assumed composite material using above values;
   computing a Brillouin Spectral Width for the assumed composite material using above values;
   computing a Brillouin Gain Coefficient for the assumed composite material using above values; and
   if the computed Brillouin Gain Coefficient is greater than a preselected value, repeating the above, otherwise, mixing the constituents at an appropriate temperature.

2. The method as recited in claim 1, wherein the various physical parameters comprise a molar mass, a mass density, an index of refraction, a longitudinal acoustic velocity, an acoustic attenuation coefficient, and a photoelastic constant for each constituent.

3. The method as recited in claim 1,
   wherein the various physical parameters comprise a molar mass and a mass density for each constituent and
   wherein the origin locations for the segments are computed using the molar mass, the mass density, and the concentration for each constituent.

4. The method as recited in claim 3,
   wherein the origin locations for the segments are computed by solving the set of equations $$\begin{pmatrix} \left(\frac{\rho_1}{M_1}([D_1]-1) - \frac{\rho_2}{M_2}[D_1]\right) & \left(\frac{\rho_2}{M_2}[D_1] - \frac{\rho_3}{M_3}[D_1]\right) & \cdots & \left(\frac{\rho_{N-1}}{M_{N-1}}[D_1] - \frac{\rho_N}{M_N}[D_1]\right) & \left(\frac{\rho_N}{M_N}[D_1]\right) \\ \left(\frac{\rho_1}{M_1}[D_2] - \frac{\rho_2}{M_2}([D_2]-1)\right) & \left(\frac{\rho_2}{M_2}([D_2]-1) - \frac{\rho_3}{M_3}[D_2]\right) & \cdots & \left(\frac{\rho_{N-1}}{M_{N-1}}[D_2] - \frac{\rho_N}{M_N}[D_2]\right) & \left(\frac{\rho_N}{M_N}[D_2]\right) \\ \vdots & \vdots & \cdots & \vdots & \vdots \\ \left(\frac{\rho_1}{M_1}[D_{N-1}] - \frac{\rho_2}{M_2}[D_{N-1}]\right) & \left(\frac{\rho_2}{M_2}[D_{N-1}] - \frac{\rho_3}{M_3}[D_{N-1}]\right) & \cdots & \left(\frac{\rho_{N-1}}{M_{N-1}}([D_{N-1}]-1) - \frac{\rho_N}{M_N}[D_{N-1}]\right) & \left(\frac{\rho_N}{M_N}[D_{N-1}]\right) \\ \left(\frac{\rho_1}{M_1}[D_N] - \frac{\rho_2}{M_2}[D_N]\right) & \left(\frac{\rho_2}{M_2}[D_N] - \frac{\rho_3}{M_3}[D_N]\right) & \cdots & \left(\frac{\rho_{N-1}}{M_{N-1}}[D_N] - \frac{\rho_N}{M_N}([D_N]-1)\right) & \left(\frac{\rho_N}{M_N}([D_N]-1)\right) \end{pmatrix} \begin{pmatrix} m_1 \\ m_2 \\ \vdots \\ m_{N-1} \\ m_N \end{pmatrix} = 0$$

for the various origin locations, wherein in the equation $D_i$ is the concentration of the i-th constituent, $\rho_i$ is the mass density of the i-th constituent, $M_i$ is the molar mass of the i-th constituent, and $m_i$ is the origin of the i-th segment.

5. The method as recited in claim 1,
wherein the various physical parameters comprise a longitudinal acoustic velocity for each constituent and
wherein the longitudinal acoustic velocity for the assumed composite material is computed using the longitudinal acoustic velocity for each constituent and the associated origin locations.

6. The method as recited in claim 5,
wherein the longitudinal acoustic velocity for the assumed composite material is computed by solving the equation $$V_L = \left(\sum_{i=1}^{N} \frac{m_i - m_{i-1}}{V_{Li}}\right)^{-1}$$

for the longitudinal acoustic velocity, wherein in the equation $V_{Li}$ is the longitudinal acoustic velocity for the i-th constituent, $m_i$ is the origin of the i-th segment, N is the number of segments (constituents), and $V_L$ is the longitudinal acoustic velocity for the assumed composite material.

7. The method as recited in claim 1,
wherein the various physical parameters comprise a photoelastic constant for each constituent and
wherein the photoelastic constant for the assumed composite material is computed using the photoelastic constant for each constituent and the associated origin locations.

8. The method as recited in claim 7,
wherein the photoelastic constant for the assumed composite material is computed by solving the equation $$p_{12} = \sum_{i=1}^{N} (m_i - m_{i-1}) p_{12i}$$

for the photoelastic constant, wherein in the equation $p_{12i}$ is the photoelastic constant for the i-th constituent, $m_i$ is the origin of the i-th segment, N is the number of segments (constituents), and $p_{12}$ is the photoelastic constant for the assumed composite material.

9. The method as recited in claim 1, further comprising:
selecting a vacuum optical wavelength, wherein the acoustic frequency for the assumed composite material is computed using the vacuum optical wavelength and the Bragg condition.

10. The method as recited in claim 9,
wherein the various physical parameters comprise an acoustic attenuation coefficient for each constituent and wherein the acoustic attenuation coefficient for the assumed composite material is computed using a reference acoustic frequency, the computed acoustic frequency, the acoustic attenuation coefficient for each constituent, and the associated origin locations.

11. The method as recited in claim 10,
wherein the acoustic attenuation coefficient for the assumed composite material is computed by solving the equation $$\alpha = (v_a/v_{ref})^2 \sum_{i=1}^{N} (m_i - m_{i-1}) \alpha_i$$

for the acoustic attenuation coefficient, wherein in the equation $\alpha_i$ is the acoustic attenuation coefficient for the i-th constituent, $m_i$ is the origin of the i-th segment, N is the number of segments (constituents), $v_{ref}$ is the reference acoustic frequency, $v_a$ is the acoustic frequency for the assumed composite material, and $\alpha$ is the acoustic attenuation coefficient for the assumed composite material.

12. The method as recited in claim 10,
wherein the various physical parameters further comprise a longitudinal acoustic velocity for each constituent,
wherein the longitudinal acoustic velocity for the assumed composite material is computed using the longitudinal acoustic velocity for each constituent and the associated origin locations, and
wherein the Brillouin Spectral Width for the assumed composite material is computed using the longitudinal acoustic velocity and the acoustic attenuation coefficient for the assumed composite material.

13. The method as recited in claim 12,
wherein the Brillouin Spectral Width for the assumed composite material is computed by solving the equation $$\Delta v_B = \frac{V_L \alpha}{\pi}$$

for the Brillouin Spectral Width, wherein in the equation $\alpha$ is the acoustic attenuation coefficient for the assumed composite material, $V_L$ is the longitudinal acoustic velocity for the assumed composite material, and $\Delta v_B$ is the Brillouin Spectral Width for the assumed composite material.

14. The method as recited in claim 12, further comprising:
selecting a vacuum optical wavelength,
wherein the various physical parameters further comprise a mass density, an index of refraction, and a photoelastic constant for each constituent, wherein the photoelastic constant for the assumed composite material is computed using the photoelastic constant for each constituent and the associated origin locations, wherein an index of refraction is computed for the assumed composite material using the index of refraction for each constituent, wherein the mass density is computed for the assumed composite material using the mass density for each constituent and the associated origin locations, and wherein the Brillouin Gain Coefficient for the assumed composite material is computed using the optical wavelength and for the assumed composite material, the index of refraction, the photoelastic constant, the mass density, the longitudinal acoustic velocity, and the Brillouin Spectral Width.

15. The method as recited in claim 14, wherein the mass density is computed for the assumed composite material is computed by solving the equation $$\rho = \sum_{i=1}^{N} (m_i - m_{i-1})\rho_i$$

for the mass density, wherein in the equation $\rho_i$ is the mass density of the i-th constituent, $m_i$ is the origin of the i-th segment, N is the number of segments (constituents), and $\rho$ is the mass density of the assumed composite material, and wherein the Brillouin Gain Coefficient for the assumed composite material is computed by solving the equation $$g_B = \frac{2\pi}{c\lambda^2 \rho} \frac{n^7 p_{12}^2}{V_L \Delta v_B}$$

for the Brillouin Gain Coefficient, wherein in the equation $\Delta v_B$ is the Brillouin Spectral Width, $V_L$ is the longitudinal acoustic velocity for the assumed composite material, $p_{12}$ is the photoelastic constant for the assumed composite material, n is the index of refraction for the assumed composite material, $\rho$ is the mass density of the assumed composite material, $\lambda$ is the vacuum optical wavelength, c is the speed of light in vacuum, and $g_B$ is the Brillouin Gain Coefficient for the assumed composite material.

16. An optical fiber, comprising:
multiple constituents,
wherein each constituent has a concentration and
wherein the constituents and their associated concentrations are selected by
obtaining values for various physical parameters for each constituent,
conceptually dividing a unit length model rod into a number of segments, wherein the number equals the number of constituents and wherein each segment is associated with a separate one of the constituents,
computing origin locations for the segments,
computing a longitudinal acoustic velocity for an assumed composite material created at an appropriate temperature using above values,
computing a photoelastic constant for the assumed composite material using above values,
computing an acoustic frequency for the assumed composite material using above values,
computing an acoustic attenuation coefficient for the assumed composite material using above values,
computing a Brillouin Spectral Width for the assumed composite material using above values,
computing a Brillouin Gain Coefficient for the assumed composite material using above values, and
if the computed Brillouin Gain Coefficient is greater than a preselected value, reselecting the constituents and their associated concentrations and repeating the above procedures, otherwise, mixing the constituents at an appropriate temperature.

17. The optical fiber as recited in claim 16,
wherein the various physical parameters comprise a molar mass, a mass density, for each constituent and
wherein the origin locations for the segments are computed using the molar mass, the mass density, and the concentration for each constituent.

18. The optical fiber as recited in claim 16,
wherein the various physical parameters comprise a longitudinal acoustic velocity for each constituent and
wherein the longitudinal acoustic velocity for the assumed composite material is computed using the longitudinal acoustic velocity for each constituent and the associated origin locations.

19. The optical fiber as recited in claim 16,
wherein the various physical parameters comprise a photoelastic constant for each constituent and
wherein the photoelastic constant for the assumed composite material is computed using the photoelastic constant for each constituent and the associated origin locations.

20. The optical fiber as recited in claim 16, wherein the acoustic frequency for the assumed composite material is computed using a selected vacuum optical wavelength and the Bragg condition.

21. The optical'fiber as recited in claim 20,
wherein the various physical parameters comprise an acoustic attenuation coefficient for each constituent and
wherein the acoustic attenuation coefficient for the assumed composite material is computed using a reference acoustic frequency, the computed acoustic frequency, the acoustic attenuation coefficient for each constituent, and the associated origin locations.

22. The optical fiber as recited in claim 21,
wherein the various physical parameters further comprise a longitudinal acoustic velocity for each constituent,
wherein the longitudinal acoustic velocity for the assumed composite material is computed using the longitudinal acoustic velocity for each constituent and the associated origin locations, and
wherein the Brillouin Spectral Width for the assumed composite material is computed using the longitudinal acoustic velocity and the acoustic attenuation coefficient for the assumed composite material.

23. The optical fiber as recited in claim 22,
wherein the various physical parameters further comprise a mass density, an index of refraction, and a photoelastic constant for each constituent,
wherein the photoelastic constant for the assumed composite material is computed using the photoelastic constant for each constituent and the associated origin locations,
wherein an index of refraction is computed for the assumed composite material using the index of refraction for each constituent, wherein the mass density is computed for the assumed composite material using the mass density for each constituent and the associated origin locations, and wherein the Brillouin Gain Coefficient for the assumed composite material is computed using a selected optical wavelength and for the assumed composite material, the index of refraction, the photoelastic constant, the mass density, the longitudinal acoustic velocity, and the Brillouin Spectral Width.

24. A means for creating a composite material for fabricating an optical fiber, comprising:

means for selecting multiple constituents and a concentration for each constituent;

means for obtaining values for various physical parameters for each constituent;

means for conceptually dividing a unit length model rod into a number of segments, wherein the number equals the number of constituents and wherein each segment is associated with a separate one of the constituents;

means for computing origin locations for the segments;

means for computing a longitudinal acoustic velocity for an assumed composite material created at an appropriate temperature using above values;

means for computing a photoelastic constant for the assumed composite material using above values;

means for computing an acoustic frequency for the assumed composite material using above values;

means for computing an acoustic attenuation coefficient for the assumed composite material using above values;

means for computing a Brillouin Spectral Width for the assumed composite material using above values;

means for computing a Brillouin Gain Coefficient for the assumed composite material using above values; and if the computed Brillouin Gain Coefficient is greater than a preselected value, means for repeating the above, otherwise, means for mixing the constituents at an appropriate temperature.

\* \* \* \* \*